3,301,847
REACTIVE DISAZO DYESTUFFS
Angelo Mangini and Antonio Tundo, Bologna, Italy, assignors to Aziende Colori Nazionali Affini ACNA, S.p.A., Milan, Italy
No Drawing. Original application May 14, 1962, Ser. No. 194,652. Divided and this application Oct. 15, 1963, Ser. No. 316,436
Claims priority, application Italy, May 17, 1961, 9,140/61
5 Claims. (Cl. 260—184)

This application is a division of our application Serial No. 194,652, filed May 14, 1962, and now abandoned.

The present invention relates to a new class of reactive dyestuffs, i.e. of dyestuffs able to form chemical bonds with a fiber during the dyeing of such fiber, to thereby produce dyes which are particularly stable to wet treatments.

Several classes of dyestuffs are already known wherein reactive groups are present.

In particular, dyestuffs are known which comprise one of the following reactive groups: monochlorotriazinic, dichlorotriazinic, chloropyrimidino, betachloropropionamido, vinylsulphonic group.

The conditions for the application of such dyestuffs vary owing to the reactivity of the particular group which is present.

There has now been found a new class of reactive dyestuffs which are completely different from those previously known. This class is characterized by the presence, as a reactive group, of a phenyl radical containing at least one active halogen atom (preferably Cl and/or Br) and one or more nucleophilic substituents (preferably $-NO_2$ and/or $-SO_3H$).

Particularly interesting results have been obtained by introducing the radical

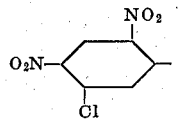

into the structure of a dye.

This radical renders dyes containing it particularly suitable for dyeing cellulosic fibers the hydroxyl groups of which react with the active halogen atom.

The dyestuffs of the present invention are prepared by reacting a suitable benzene derivative with aromatic amines containing carboxyl or sulphonic groups, or with aromatic diamines.

Among the products obtained starting from 1,3 - dichloro - 4,6 - dinitrobenzene are included those products having the following structure:

I
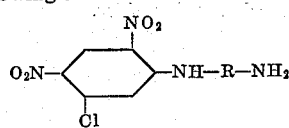

wherein R is an aryl or diaryl radical, and may either be unsubstituted or substituted, preferably with carboxyl and/or sulphonic groups, such as the radical of the G, R, H, J (6-amino-1-naphthol-3-sulphonic) acids.

Products of the Formula I, by virtue of diazotation and successive coupling with conventional coupling agents, in some cases provided with solubilizing groups, can be caused to produce dyestuffs of the following formula II
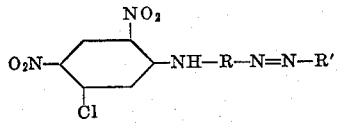

wherein R has the previously indicated meaning, and wherein R' is the residue of the amino or phenolic coupling agent, which residue may contain substituents, such as for example $NO_2$, $SO_3H$, Cl, and may or may not contain solubilizing groups.

If R and R' contain —OH groups in the ortho position with respect to the diazo group, metallization may be performed between these two —OH groups.

When R' contains an amino group which in turn can be diazotized or coupled, compounds having a polyazo structure are obtained, which compounds exhibit good dyeing characteristics. Such polyazo compounds may be represented by the formula III
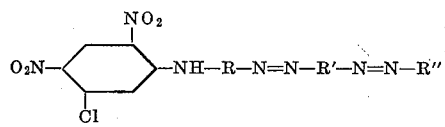

wherein R is selected from the group consisting of aromatic and substituted aromatic radicals, and R' and R" are each residues of coupling agents selected from the group consisting of amino and phenolic coupling agents.

Alternatively, dyestuffs according to the present invention can be prepared by reacting a suitable benzene derivative containing substituents as above defined, together with azo dyestuffs containing a free amino group.

The present invention thus comprises polyazo dyestuffs containing as reactive groups a phenyl radical which contains at least one halogen atom (preferably Cl and/or Br) and one or more nucleophilic substituents (preferably $-NO_2$ and/or $-SO_3H$), and more precisely polyazo dyestuffs comprised in the Formula III.

All these dyestuffs are characterized by the presence of the reactive radical

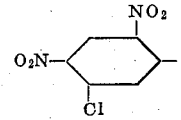

which makes them able to chemically bind themselves to treated fibers and particularly to cellulosic fibers.

The dyeing process with the aid of said dyestuffs is preferably carried out at a pH of from about 10 to 11 and gives shades having a very good fastness to wet treatments.

The following examples will further illustrate this invention.

*Example 1*

1 mole of 1,3-dichloro-4,6-dinitrobenzene is reacted in alcoholic solution together with 1 mole of p-phenylenediamine.

After boiling the mixture for a short time, a crystalline precipitate is obtained which is purified by crystallization from chloro-benzene.

The product thus obtained has the following structure:

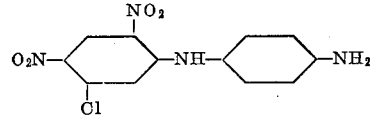

M.P.=192-3° C. red shade 1 mole of the above mentioned product (obtained from the condensation of 1,3-dichloro-4,6-dinitrobenzene with p-phenylene-diamine) is batched with 3-4 moles of dilute HCl.

To the yellow suspension thus obtained is added an aqueous solution of sodium nitrite at room temperature to form a diazonium salt.

A solution of the azo compound, obtained by coupling the diazo of p-nitro-aniline with H acid in an acidic medium, is treated with the foregoing diazo of the condensation product obtained from 1,3-dichloro-4,6-dinitrobenzene and p-phenylenediamine.

The treatment is carried out in alkaline medium, with stirring for 8–12 hours at room temperature.

The mixture is salted with ammonium sulphate. A bisazo compound is obtained which dyes cotton in washfast green-blue shades.

*Examples 2 and 3*

The following two formulas indicate other reactive dyestuffs of the present invention, which dyestuffs are obtained in a manner analogous to that indicated in the preceding example.

(1)
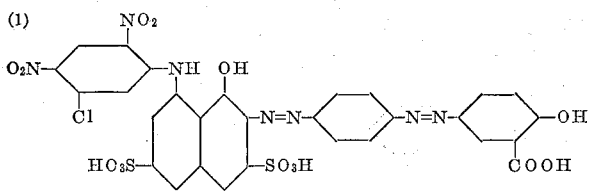

(2)
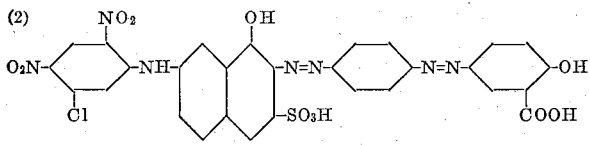

*Example 4*

Any of the dyestuffs described in the preceding examples is used for dyeing cotton according to the following method:

Concentration, dyestuff/fiber: 2%
Bath ratio: 1/25

The fiber is dipped into the dye solution at room temperature in order to make possible the inhibition. After about 10 minutes the addition of sodium sulphate as 20–25% aqueous solution and in the ratio of 10–15 g./l. on the dyeing bath is commenced.

The addition is carried out slowly (during the dyeing process) in order to avoid precipitation of the dyestuff.

Caustic soda, as 2.5% solution, is added in order to maintain the pH at a value of from about 10 to 11.

The bath is heated at 70–80° C. and this temperature is maintained constant for from 2 to 2½ hours.

The dyed material is wrung, washed with water, and is then washed with a 2.5% soap solution (temperature: 90° C.; time: 10–30 minutes). Finally the material is washed with water. The material thus treated, even when subjected to a further prolonged treatment with soap, does not lose dye. Fast dyeings are realized.

*Example 5*

The dyeing bath is prepared as described in the foregoing example; the yarn is impregnated in the bath and is dried at about 110° C.

The material is then treated with soap as described in the preceding example. Dark and fast shades are realized.

Variations can of course be made without departing from the spirit of the invention.

Having thus described the invention, what is desired to be secured and claimed by Letters Patent is:

1. A reactive dyestuff having the formula

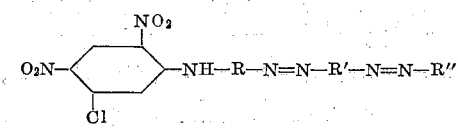

wherein R, R' and R" are each selected from the group consisting of phenyl, naphthyl, substituted phenyl and substituted naphthyl radicals, the substituents on said substituted radicals being selected from the group consisting of —OH, —COOH, —SO$_3$H, —NO$_2$, —NH$_2$ and —Cl.

2. The dyestuff of claim 1 wherein said substituents on said R radicals are selected from the group consisting of —OH, —COOH and —SO$_3$H.

3. A reactive dyestuff having the structure

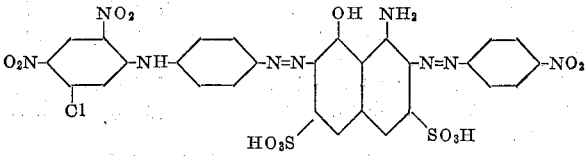

4. A reactive dyestuff having the structure

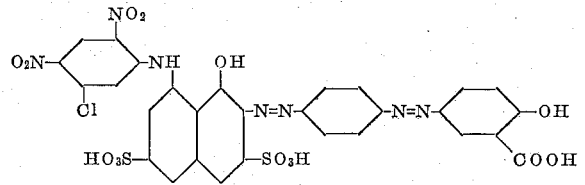

5. A reactive dyestuff having the structure

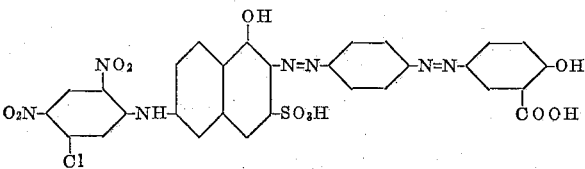

No references cited.

CHARLES B. PARKER, *Primary Examiner.*

F. D. HIGEL, *Assistant Examiner.*